(12) United States Patent
Ishida et al.

(10) Patent No.: US 7,246,112 B2
(45) Date of Patent: Jul. 17, 2007

(54) SEARCHING APPARATUS AND SEARCHING METHOD

(75) Inventors: Tessho Ishida, Tokyo (JP); Kenji Tomizawa, Tokyo (JP); Nobuyuki Kihara, Tokyo (JP); Shoichi Awai, Tokyo (JP); Ichiro Sakamoto, Tokyo (JP); Ippei Tambata, Tokyo (JP)

(73) Assignee: Sony Corporation, Tokyo (JP)

( * ) Notice: Subject to any disclaimer, the term of this patent is extended or adjusted under 35 U.S.C. 154(b) by 552 days.

(21) Appl. No.: 10/161,224

(22) Filed: May 31, 2002

(65) Prior Publication Data

US 2003/0105748 A1    Jun. 5, 2003

(30) Foreign Application Priority Data

Nov. 30, 2001    (JP)    ............................ P2001-367863

(51) Int. Cl.
    *G06F 17/30* (2006.01)
(52) U.S. Cl. .................... 707/3; 707/4; 707/7
(58) Field of Classification Search ................ 707/102, 707/1–5, 7, 104.1; 715/764, 968
    See application file for complete search history.

(56) References Cited

U.S. PATENT DOCUMENTS

| | | | | |
|---|---|---|---|---|
| 5,262,944 | A   * | 11/1993 | Weisner et al. | ............. 600/300 |
| 6,317,605 | B1 * | 11/2001 | Sakuma | ....................... 455/457 |
| 6,564,206 | B1 * | 5/2003 | Ikeda | ............................ 707/3 |
| 6,785,688 | B2 * | 8/2004 | Abajian et al. | ............. 707/102 |
| 6,801,229 | B1 * | 10/2004 | Tinkler | ........................ 715/853 |
| 7,003,505 | B1 * | 2/2006 | Funakoshi | ..................... 707/1 |
| 2002/0042792 | A1 * | 4/2002 | Nishioka et al. | ............... 707/5 |

OTHER PUBLICATIONS

U.S. Appl. No. 10/161,553, filed May 31, 2002, Tessho Ishida.
U.S. Appl. No. 10/161,216, filed May 31, 2002, Tessho Ishida.

* cited by examiner

*Primary Examiner*—Cam Linh Nguyen
(74) *Attorney, Agent, or Firm*—Wolf, Greenfield & Sacks, P.C.

(57) ABSTRACT

A searching apparatus and a searching method are disclosed whereby a storage medium containing a plurality of data items and management data for managing these data items is subjected to a sort based on a sort condition and a search based on a search condition. The data retrieved through the search are displayed in accordance with a given condition.

12 Claims, 15 Drawing Sheets

FIG. 5

| SELECTED/ UNSELECTED | NO | TITLE | TIME | | TITLE | SIZE |
|---|---|---|---|---|---|---|
| ● | 007 | GGGGG | 4:47 | | | |
| ○ | 008 | HHHHH | 9:34 | | | |
| ○ | 009 | IIIII | 6:07 | | | |
| ● | 001 | AAAAA | 8:26 | | ABCDE | 11.7MB |
| ● | 002 | BBBBB | 6:13 | BBBBB 132Kbps 19.3MB | OPQRS | 10.6MB |
| ● | 003 | CCCCC | 5:48 | | GHIJKL | 12.3MB |
| ○ | 004 | DDDDD | 4:56 | | AAAAA | 10.8MB |
| ○ | 005 | EEEEE | 7:35 | | | |
| ○ | 006 | FFFFF | 7:14 | | | |

REMAINING RECORDING TIME : 03 Min. 30 Sec.

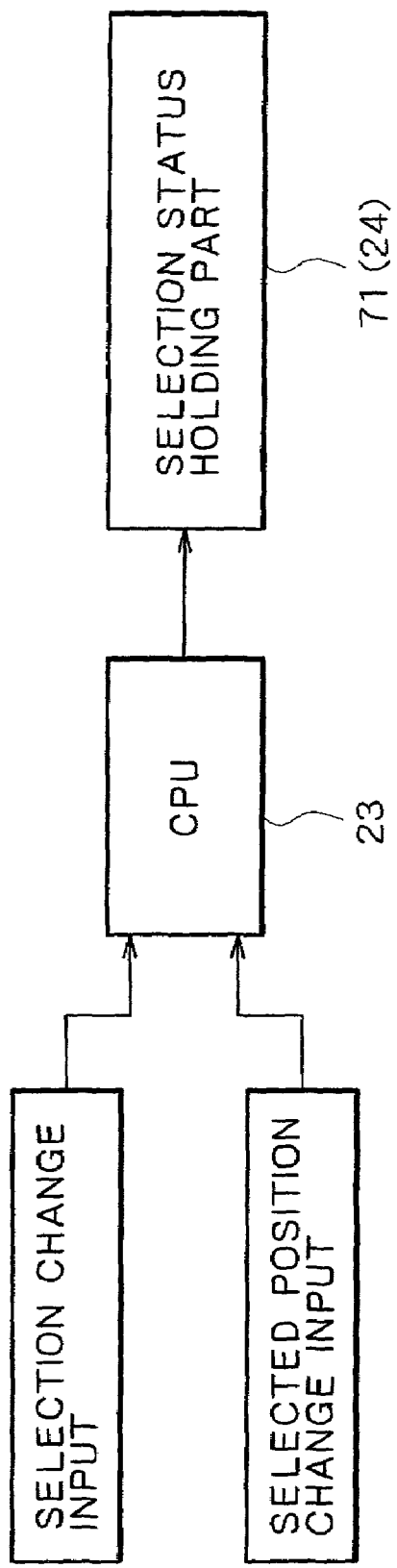

FIG. 7A

| SELECTED/ UNSELECTED | MUSIC TITLE | ARTIST NAME | TIME |
|---|---|---|---|
| ● | FFFFF | Tom | 7:14 |
| ● | GGGGG | Tom | 4:47 |
| ● | HHHHH | Tom | 9:34 |
| ● | IIIII | Bob | 6:07 |
| ○ | AAAAA | Bob | 8:26 |
| ● | BBBBB | John | 6:13 |
| ● | CCCCC | John | 5:48 |
| ● | DDDDD | John | 4:56 |
| ● | EEEEE | John | 7:35 |

☐ DESIGNATION ON/OFF   ☐ ALL DESIGNATIONS ON/OFF   ☐ COPY

FIG. 7B

| SELECTED/ UNSELECTED | MUSIC TITLE | ARTIST NAME | TIME |
|---|---|---|---|
| ● | FFFFF | Tom | 7:14 |
| ● | GGGGG | Tom | 4:47 |
| ● | HHHHH | Tom | 9:34 |
| ● | IIIII | Bob | 6:07 |
| ● | AAAAA | Bob | 8:26 |
| ● | BBBBB | John | 6:13 |
| ● | CCCCC | John | 5:48 |
| ● | DDDDD | John | 4:56 |
| ● | EEEEE | John | 7:35 |

☐ DESIGNATION ON/OFF   ☐ ALL DESIGNATIONS ON/OFF   ☐ COPY

FIG. 7C

| SELECTED/ UNSELECTED | MUSIC TITLE | ARTIST NAME | TIME |
|---|---|---|---|
| ○ | FFFFF | Tom | 7:14 |
| ○ | GGGGG | Tom | 4:47 |
| ○ | HHHHH | Tom | 9:34 |
| ○ | IIIII | Bob | 6:07 |
| ○ | AAAAA | Bob | 8:26 |
| ○ | BBBBB | John | 6:13 |
| ○ | CCCCC | John | 5:48 |
| ○ | DDDDD | John | 4:56 |
| ○ | EEEEE | John | 7:35 |

☐ DESIGNATION ON/OFF   ☐ ALL DESIGNATIONS ON/OFF   ☐ COPY

FIG.8

| SELECTED/<br>UNSELECTED | MUSIC<br>TITLE | ARTIST<br>NAME | TIME |
|---|---|---|---|
| ● | IIIII | Bob | 6:07 |
| ○ | AAAAA | Bob | 8:26 |
| ● | BBBBB | John | 6:13 |
| ● | CCCCC | John | 5:48 |
| ● | DDDDD | John | 4:56 |
| ● | EEEEE | John | 7:35 |
| ● | FFFFF | Tom | 7:14 |
| ● | GGGGG | Tom | 4:47 |
| ● | HHHHH | Tom | 9:34 |

☐ DESIGNATION ON/OFF    ☐ ALL DESIGNATIONS ON/OFF    ☐ COPY

FIG. 10

| ALBUM NAME | MUSIC TITLE | ARTIST NAME | TIME AND DATE OF RECORDING | AUDIO DATA ITEM |

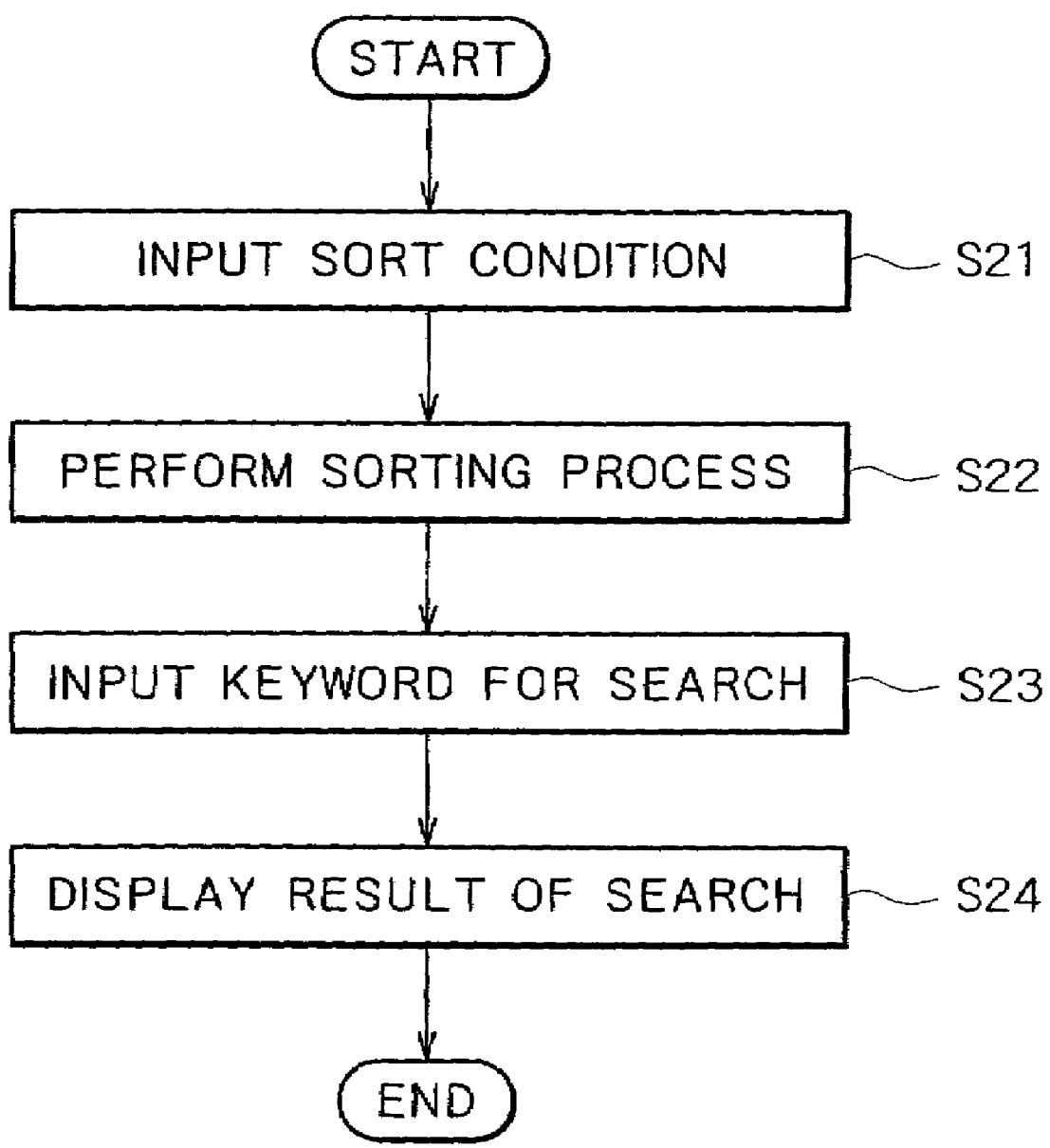

FIG. 13A

| ALBUM NAME | MUSIC TITLE | ARTIST NAME | DATE |
|---|---|---|---|
| 44444 | UUUUU | John | Dec. 1, 2001 |
| 22222 | PPPPP | Bob | Nov. 10, 2001 |
| 11111 | CCCCC | Tom | Nov. 2, 2001 |
| 22222 | RRRRR | Bob | Nov. 10, 2001 |
| 44444 | QQQQQ | John | Dec. 1, 2001 |
| 22222 | OOOOO | Bob | Nov. 10, 2001 |
| 44444 | SSSSS | John | Dec. 1, 2001 |
| 11111 | VVVVV | Tom | Nov. 2, 2001 |
| 33333 | ZZZZZ | Ann | Nov. 2, 2001 |
| 11111 | DDDDD | Tom | Nov. 2, 2001 |
| 33333 | XXXXX | Ann | Nov. 2, 2001 |
| 11111 | YYYYY | Tom | Nov. 2, 2001 |
| 22222 | TTTTT | Bob | Nov. 10, 2001 |
| 33333 | AAAAA | Ann | Nov. 2, 2001 |
| 44444 | BBBBB | John | Dec. 1, 2001 |

FIG. 13B

| ALBUM NAME | MUSIC TITLE | ARTIST NAME | DATE |
|---|---|---|---|
| 33333 | AAAAA | Ann | Nov. 2, 2001 |
| 33333 | XXXXX | Ann | Nov. 2, 2001 |
| 33333 | ZZZZZ | Ann | Nov. 2, 2001 |
| 22222 | OOOOO | Bob | Nov. 10, 2001 |
| 22222 | PPPPP | Bob | Nov. 10, 2001 |
| 22222 | RRRRR | Bob | Nov. 10, 2001 |
| 22222 | TTTTT | Bob | Nov. 10, 2001 |
| 44444 | BBBBB | John | Dec. 1, 2001 |
| 44444 | QQQQQ | John | Dec. 1, 2001 |
| 44444 | SSSSS | John | Dec. 1, 2001 |
| 44444 | UUUUU | John | Dec. 1, 2001 |
| 11111 | CCCCC | Tom | Nov. 2, 2001 |
| 11111 | DDDDD | Tom | Nov. 2, 2001 |
| 11111 | VVVVV | Tom | Nov. 2, 2001 |
| 11111 | YYYYY | Tom | Nov. 2, 2001 |

FIG. 13C

| ALBUM NAME | MUSIC TITLE | ARTIST NAME | DATE |
|---|---|---|---|
| 22222 | RRRRR | Bob | Nov. 10, 2001 |
| 22222 | TTTTT | Bob | Nov. 10, 2001 |
| 44444 | BBBBB | John | Dec. 1, 2001 |
| 44444 | QQQQQ | John | Dec. 1, 2001 |
| 44444 | SSSSS | John | Dec. 1, 2001 |
| 44444 | UUUUU | John | Dec. 1, 2001 |
| 11111 | CCCCC | Tom | Nov. 2, 2001 |

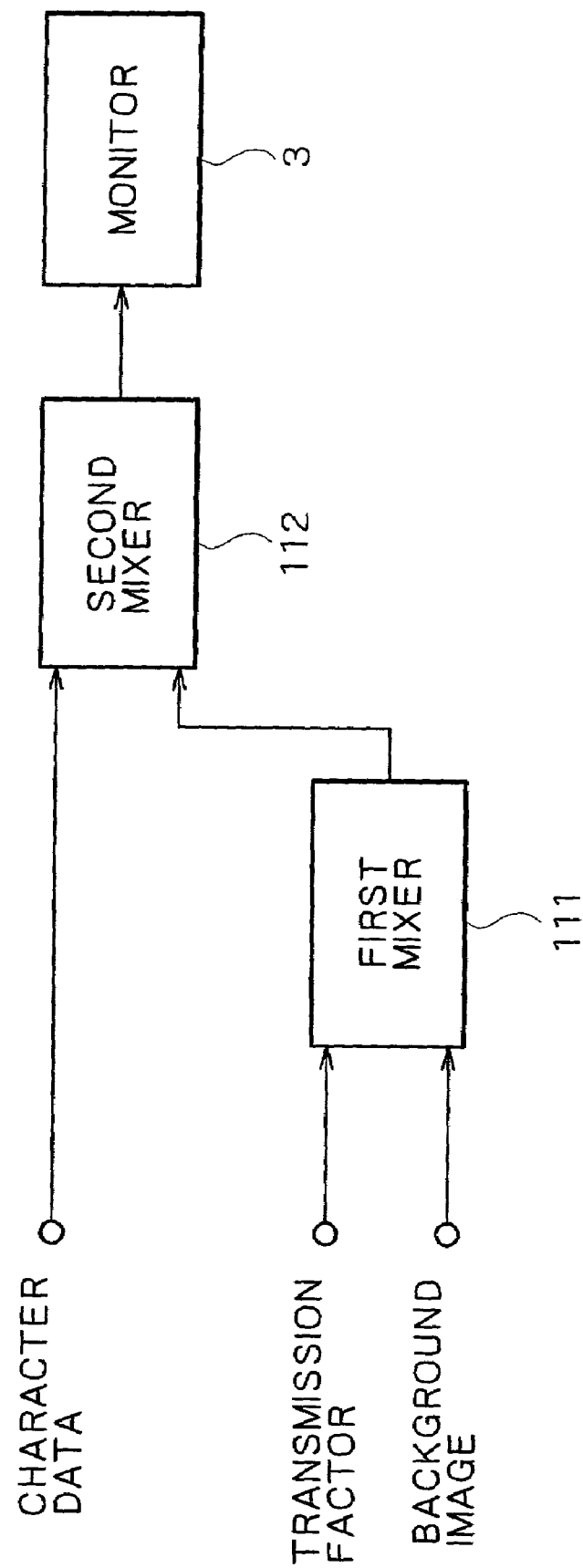

FIG. 15

| ALBUM NAME | MUSIC TITLE | ARTIST NAME | DATE |
|---|---|---|---|
| 22222 | RRRRR | Bob | Nov. 10, 2001 |
| 22222 | TTTTT | Bob | Nov. 10, 2001 |
| 44444 | BBBBB | John | Dec. 1, 2001 |
| 44444 | QQQQQ | John | Dec. 1, 2001 |
| 44444 | SSSSS | John | Dec. 1, 2001 |
| 44444 | UUUUU | John | Dec. 1, 2001 |
| 11111 | CCCCC | Tom | Nov. 2, 2001 |

SEARCHING APPARATUS AND SEARCHING METHOD

BACKGROUND OF THE INVENTION

The present invention relates to a searching apparatus and a searching method for searching through a storage medium containing a plurality of data items and management data for managing these data items, on the basis of a given search condition.

Personal computers typically incorporate a mass-storage hard disc in their body. The hard disc allows a user to store data such as a plurality of audio data items. When reproducing a desired audio data item from the hard disc, the user searches for a file of the desired audio data item from an appropriate folder on the hard disc and puts the retrieved file to execution.

Conventionally, a monitor of the personal computer displays simply a menu of files held on the hard disc. Where there are hundreds of audio data items retained on the hard disc, a search for a desired file from among the displayed menu can be a very tiresome chore for the user.

SUMMARY OF THE INVENTION

The present invention has been made in view of the above circumstances and provides a searching apparatus and a searching method for permitting an easy search for a desired data item through the data stored on a storage medium and for displaying the result of the search in a readily comprehensible manner, whereby the ease of use of the apparatus is enhanced.

In carrying out the invention and according to one aspect thereof, there is provided a searching apparatus for searching through a storage device which holds main data based on a search condition and for displaying data retrieved through the search, the searching apparatus comprising: a management data inputting element for inputting management data for managing the main data held on the storage device; a storing element for storing the input management data; a sorting element for sorting, based on a sort condition, the management data stored by the storing element; a searching element for searching through the management data stored by the storing element based on a search condition; a condition inputting element for inputting the sort condition and the search condition; a displaying element for displaying results of the search and the sort on a display device connected to the searching apparatus; and a controlling element for controlling a display location of the management data on the display device in accordance with a degree of relation between the management data retrieved through the search and the search condition.

According to another aspect of the invention, there is provided a searching method for searching through a storage device which holds main data based on a search condition and for displaying data retrieved through the search, the searching method comprising the steps of: inputting management data for managing the main data held on the storage device; storing the input the management data; inputting a sort condition by which to sort the stored management data; sorting the stored management data based on the input sort condition; inputting a search condition by which to search through the stored management data; searching through the stored management data based on the input search condition; and displaying the management data based on results of the search and the sort and in accordance with a degree of relation between the management data retrieved through the search and the search condition.

With these configurations, the inventive apparatus and method permit sorting of search-use data items stored in association with a plurality of main data items on the storing element, before allowing the user to input a search condition by which to search through the main data items. The sorted search-use data are subjected to a search based on the input search condition. Following the search, the search-use data item judged to be most closely associated with the search condition is displayed in a substantially central location of the screen flanked by the sorted data items, whereby the visibility of the search result on display is improved appreciably.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 5 is an explanatory view of a menu display screen in effect while copying is in progress;

FIG. 6 is an explanatory view of an information processing apparatus function for selecting data to be copied;

FIGS. 7A, 7B and 7C are explanatory views of menu display screens in effect when the data to be copied are selected;

FIG. 8 is an explanatory view of a menu display screen in effect when the data to be copied are changed;

FIG. 10 is a schematic view of a format in which data are stored onto the hard disc;

FIG. 12 is a flowchart of steps constituting a data search procedure;

FIGS. 13A, 13B and 13C are explanatory views of search screens being changed successively;

FIG. 14 is a block diagram of an information processing apparatus function for varying the transmission factor regarding each data item block on a menu display screen; and FIG. 15 is an explanatory view of a menu display screen on which the transmission factor is varied block by block.

DESCRIPTION OF THE PREFERRED EMBODIMENTS

Figure 1:
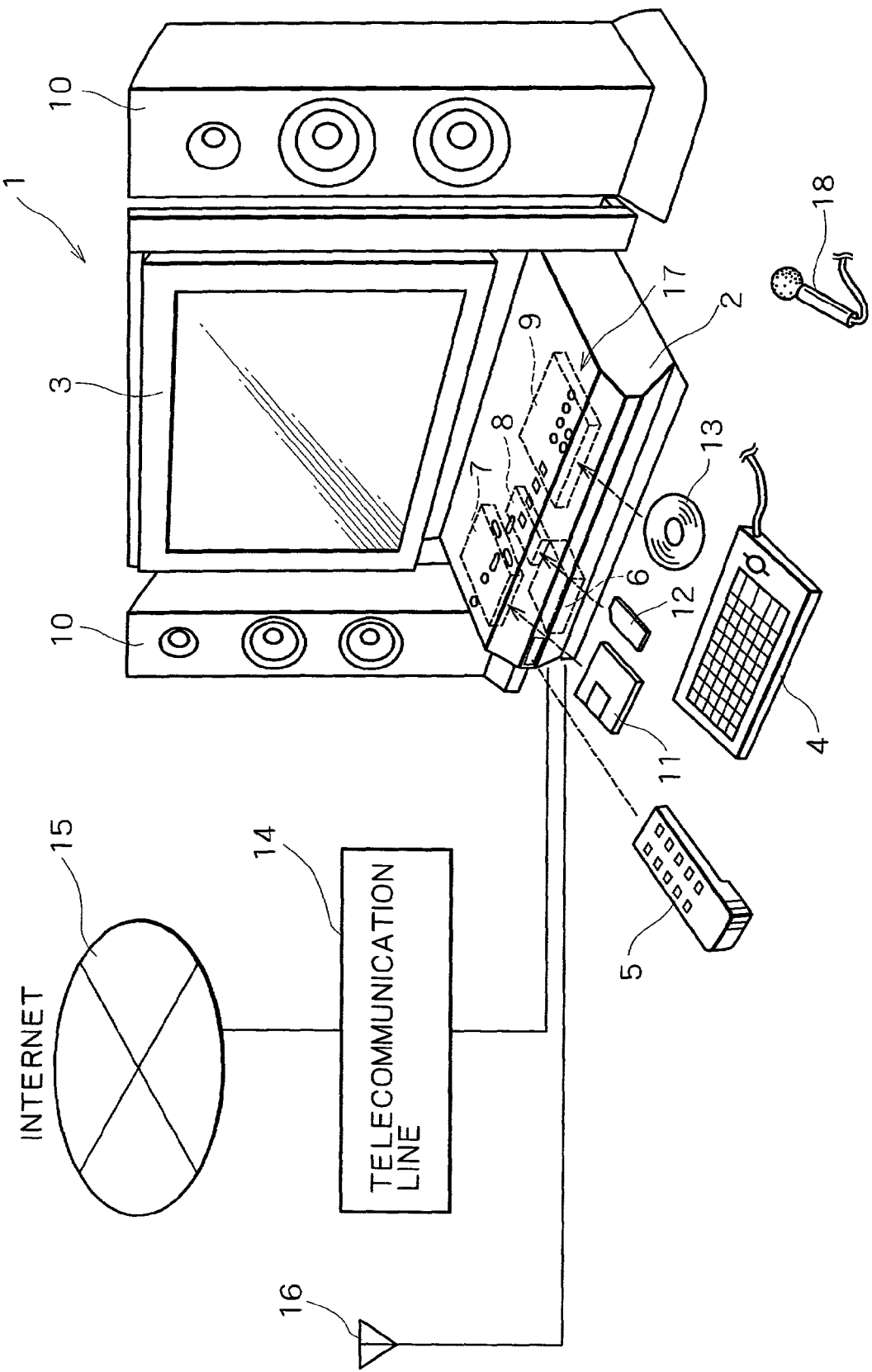
FIG. 1 is an external perspective view of an information processing apparatus according to the invention.

Preferred embodiments of the invention will now be described by referring to the accompanying drawings, with the emphasis on an information processing apparatus. As shown in FIG. 1, an information processing apparatus 1 according to the invention has functions substantially similar to those of commonly used personal computers. The apparatus 1 comprises a body 2, a monitor 3 such as a CRT (cathode ray tube) or an LCD (liquid crystal display) connected to the body 2, speakers 10 connected to the body 2; an input unit 4 made up of a keyboard, a mouse, a track ball, and/or a joystick for inputting operation signals to the body 2; and a remote controller 5 for remotely controlling the body 2.

The apparatus body 2 incorporates a hard disc drive (HDD) 6 that stores an operating system, browsing software, an e-mail program, communication protocol settings, application programs, audio data, and other content data such as movie data. The body 2 also contains a disc cartridge drive 7, an IC card drive 8 and an optical disc drive 9. Each drive functions as an external storage drive that may have a suitable storage medium loaded in the body 2 removably. The disc cartridge drive 7 uses a disc cartridge 11 housing a magneto-optical disc as a storage medium; the IC card drive 8 utilizes an IC card 12 containing a semiconductor memory as a storage medium; and the optical disc drive 9 accommodates an optical disc 13 such as a CD or a DVD. The apparatus body 2 is connected to a network 15 such as the Internet by means of telecommunication lines 14. In addition, the body 2 incorporates receivers which receive TV and radio broadcasts and which are connected to an antenna 16. At the front top of the body 2 is an operation unit 17 made of a plurality of pushbuttons used to execute basic operations of the apparatus body 2.

With the information processing apparatus 1 having the above-described body 2, the optical disc 13 such as a CD or a DVD may be loaded into the optical disc drive 9, the disc cartridge 11 into the disc cartridge drive 7, or the IC card 12 into the IC card drive 8. From the storage medium thus loaded into the external storage, recorded content data such as audio data may be retrieved and saved into the HDD 6. The HDD 6 is capable of storing content data such as audio data downloaded over the telecommunication lines 14 through EMD (electronic music distribution) services. The HDD 6 may also store TV and radio broadcast programs. Varieties of content data thus recorded to the HDD 6 may be retrieved therefrom and listened to through the speakers 10 or viewed on the monitor 3.

The information processing apparatus 1 is capable of copying various content data from the HDD 6 to the external storage such as the disc cartridge 11, IC card 12 or optical disc 13. This allows the user to reproduce the copied content data using a suitable portable player in his or her possession.

With large quantities of content data stored on the HDD 6, the information processing apparatus 1 permits easy retrieval of desired data from among those stored. When furnished with a microphone 18, the information processing apparatus 1 allows the user to search for and retrieve the targeted content data by voice.

Furthermore, the information processing apparatus 1 allows the user to browse websites or send and receive e-mail when connected to the network 15 (Internet) via telecommunication lines 14.

Figure 2:
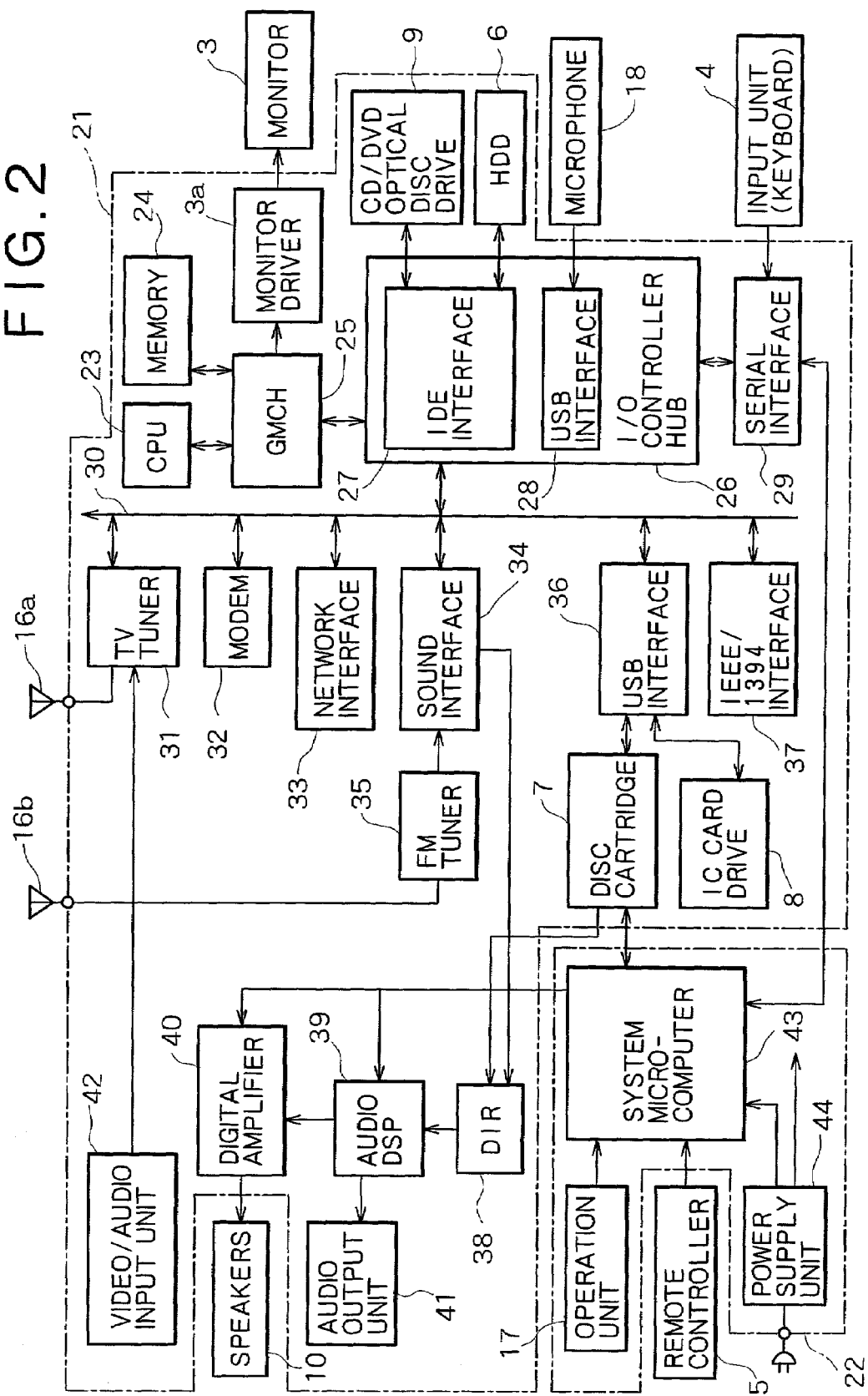
FIG. 2 is a block diagram of the information processing apparatus in FIG. 1.

A typical circuit structure of the information processing apparatus 1 above will now be described with reference to FIG. 2. The apparatus 1 is made up broadly of two sections: a computer 21 that carries out diverse kinds of information processing, and a system control unit 22 that controls the computer 21.

In the computer 21, a CPU (central processing unit) 23 provides overall control of the computer 21. A memory 24 illustratively composed of a RAM (random access memory) is loaded with data typically from the hard disc, the loaded data being operated on by the CPU 23. A GMCH (graphic memory control hub) 25 incorporating a monitor cache and an image display controller functions as a control unit that controls both access to the memory 24 and image display on the monitor 3. The GMCH 25 also provides an interface between the CPU 23 and other circuits including an ICH (I/O controller hub) 26. A monitor driver 3a converts video signals to a predetermined signal format before outputting the converted signals to the monitor 3 for display.

The ICH (I/O controller hub) 26 for controlling data input and output has an IDE (integrated drive electronics) interface 27 and a USB (universal serial bus) interface 28. The IDE interface 27 interfaces with the HDD 6 and optical disc drive 9, while the USB interface 28 interfaces with a USB-connectable device such as the microphone 18. A serial interface 29 controls serial communications and is connected with the input unit 4 such as the keyboard as well as with a system microcomputer 43. The input from the input unit 4 or from the system microcomputer 43 is forwarded to the ICH 26 through the serial interface 29.

A PCI (peripheral component interconnect) bus 30 is connected to a TV tuner 31 and a modem 32 as well as to the ICH 26. The TV tuner 31 connected to a TV antenna 16a receives RF signals therefrom and demodulates the received signals before outputting the demodulated signals onto the PCI bus 30. Illustratively, TV signals are recorded to the HDD 6 via the PCI bus 30. The TV tuner 31 selectively receives the input from a video/audio input unit 42 or from the TV antenna 16a so as to place the selected input onto the PCI bus 30. The modem 32 performs digital-to-analog or analog-to-digital data conversion and effects necessary line control to communicate with external communication devices over telephone lines. A network interface 33 permits communications through the Ethernet (registered trademark). A sound interface 34 selectively outputs input audio signals to relevant circuits. An FM tuner 35 receives FM broadcast signals from an FM antenna 16b and demodulates the received signals before outputting the demodulated signals to the sound interface 34.

The disc cartridge drive 7 is loaded with a disc cartridge containing a magneto-optical disc or an optical disc as the storage medium and is controlled by the system microcomputer 43. Data are input to and output from the disc cartridge drive 7 through the USB interface 36. The data input and output may alternatively be effected through an I$_2$C interface constituting a serial I/O bus. The IC card drive 8 is loaded with an IC card containing a semiconductor memory as the storage medium. Data input and output to and from the IC card drive 8 as well as its control are carried out through the USB interface 36. An IEEE 1394 interface 37 controls communications in the IEEE 1394 format and interfaces with the PCI bus 30.

A DIR (digital audio interface receiver) 38 that selectively receives digital audio data switches the audio signal to be sent to the outside. Illustratively, the audio signal fed from the disc cartridge drive 7 or from the sound interface 34 is forwarded selectively to an audio DSP (digital signal processor) 39 through the DIR 38. The audio DSP 39 acting as an audio data processor subjects the audio signal from the DIR 38 to equalizing and other necessary signal processes before outputting the processed signal to a digital amplifier 40 or an audio output unit 41. The digital amplifier 40 amplifies the audio signal to a level high enough for audible output through the speakers 10. The audio output unit 41 performs signal level rectification and other relevant processes before sending the audio signal to an external device.

The system microcomputer 43 as part of the system control unit 22 is connected to the serial interface 29 and feeds the input from the operation unit 17 or remote controller 5 to the CPU 23 or other relevant circuits through the serial interface 29. A power supply unit 44 supplies power to the system microcomputer 43 and other circuits. Under control of the (system microcomputer 43, the power supply unit 44 turns on and off the supply of power to the computer 21.

Described below with reference to the accompanying drawings is an example in which audio data held on the optical disc 13 placed in the optical disc drive 9 are copied to the HDD 6 of the information processing apparatus 1 described above.

When the user first operates the operation unit 17, remote controller 5 or input unit 4 suitably, the information processing apparatus 1 loads into the memory 24 an application program for copying audio data from the optical disc drive 9 to the hard disc under control of the CPU 23. The user then loads the appropriate optical disc 13 into the optical disc drive 9 of the information processing apparatus 1.

Figure 3:
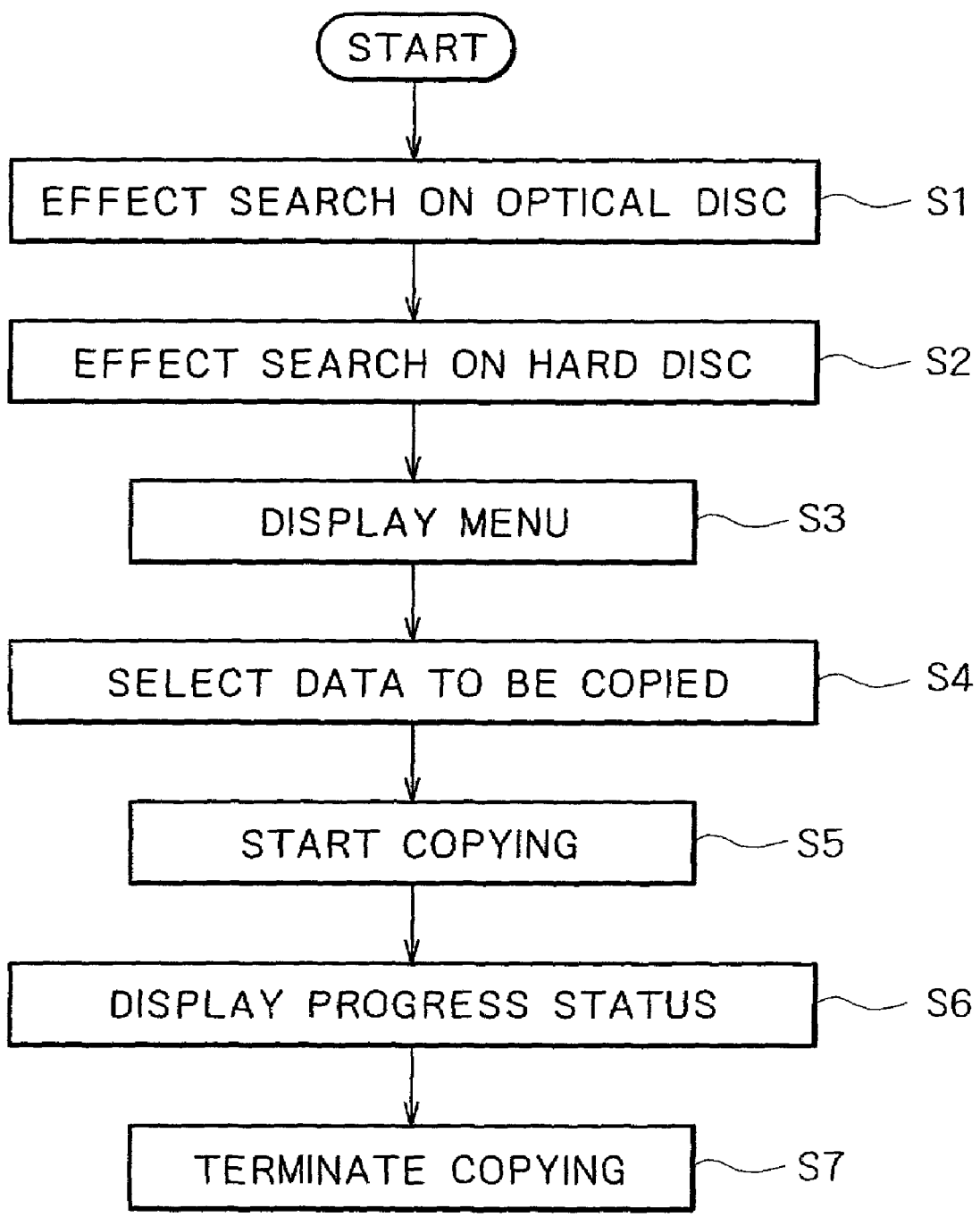
FIG. 3 is a flowchart of steps in which data held on an optical disc are copied to a hard disc.

As shown in FIG. 3, the information processing apparatus 1 activates the optical disc drive 9 in step S1 to search a TOC (table of contents) or like management information on the loaded optical disc 13 for retrieval of the table of data held on the disc. The data retrieved through the search are placed into the memory 24. In step S2, the CPU 23 performs a search through the audio data stored on the HDD 6. In step S3, the GMCH 25 under control of the CPU 23 causes the monitor 3 to give a menu display of the results of the search. Specifically, the monitor 3 displays lists of the audio data held on the optical disc 13 and of the audio data stored on the HDD 6.

Figure 4:
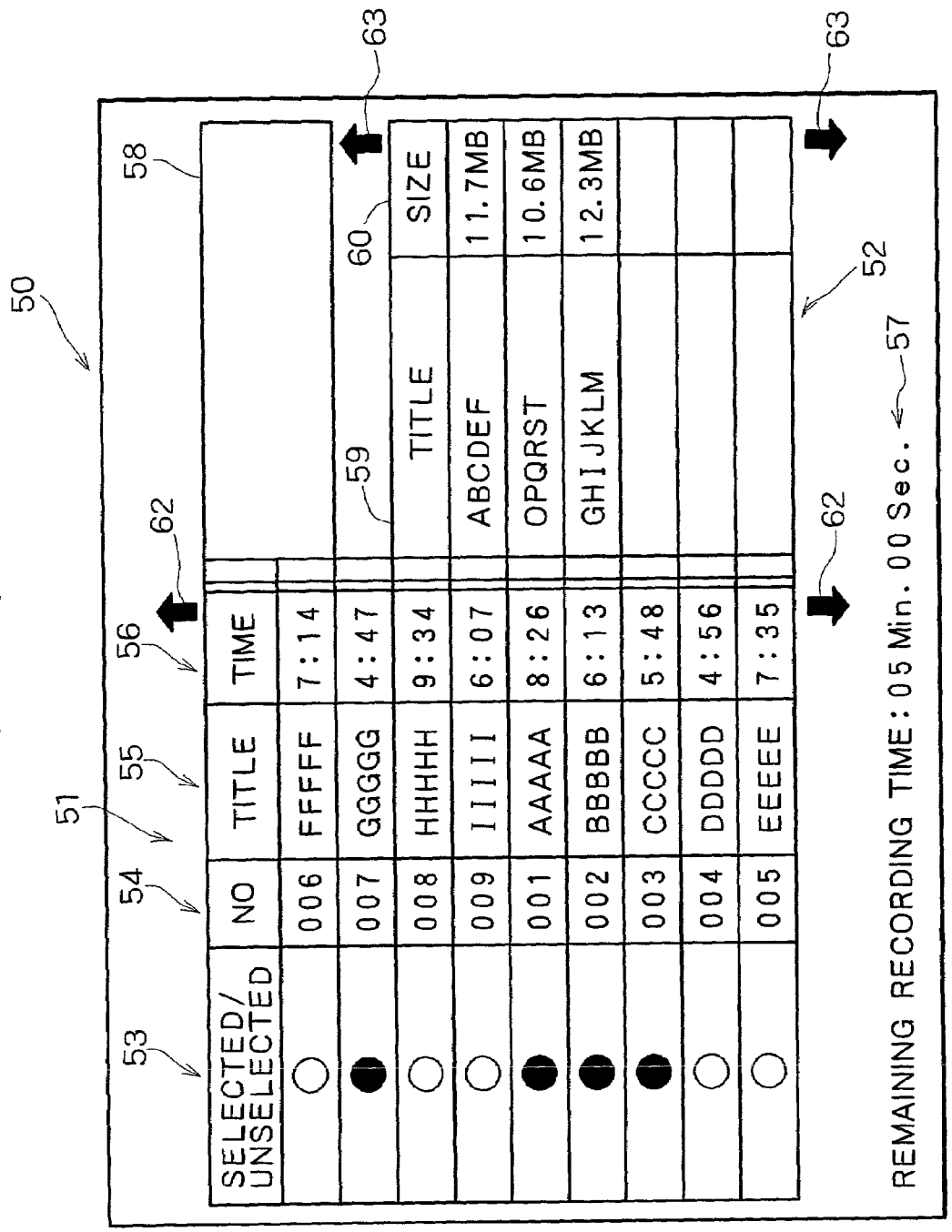
FIG. 4 is an explanatory view of a menu display screen in effect before copying is started.

A typical menu display screen 50 for listing the audio data held on the optical disc 13 and HDD 6 is explained below by referring to FIG. 4. The screen 50 includes an optical disc-dedicated display area 51 and a hard disc-dedicated display area 52 arranged side by side. The optical disc-dedicated display area 51 shows data contents recorded on the optical disc, while the hard disc-dedicated display area 52 indicates data contents stored on the hard disc. The menu display screen 50 also includes a copying time display area 57 indicating the expected time required to copy all selected audio data, and a first indicator area 58 that provides a bar chart-like indication showing how far the copying of the selected audio data has progressed. Furthermore, the menu display screen 50 comprises scroll buttons 62 and 63. The scroll buttons 62 are used to scroll the audio data displayed in the optical disc-dedicated display area 51, and the scroll buttons 63 are operated to scroll the audio data shown in the hard disc-dedicated display area 52.

The optical disc-dedicated display area 51 includes four subordinate areas: a selection status display area 53 indicating the selected or unselected state of audio data to be copied; a sequence display area 54 indicating the recording sequence of the audio data stored on the optical disc 13; a music title display area 55 showing the titles of pieces of music; and a playing time display area 56 indicating the reproduction times of the audio data items held on the optical disc 13. The selection status display area 53, sequence display area 54, and playing time display area 56 have their fields arranged in rows, each row of fields being assigned to a single item of audio data stored on the optical disc 13. In the optical disc-dedicated display area 51, the numbers in the sequence display area 54 are arranged in such a manner that the data item numbered "1" appears in the middle of the area. Under the data item numbered "1" come those with their numbers arranged in ascending order ("2," "3," "4,"etc.). Immediately above the item numbered "1" appears the last data item with the highest number ("9" in the example of FIG. 4) followed upwards by the items with their numbers in descending order ("8," "7," etc.). In other words, the optical disc-dedicated display area 51 displays part of a loop-like data sequence made up of sequentially sorted data item numbers with the first number "1" positioned adjacent to the last number ("9" in FIG. 4), the data item numbered "1" being located in the middle of the area. As a result, the optical disc-dedicated display area 51 indicates the audio data item numbered "1" in the middle of the sequence display area 54, the item numbered "1" being followed downwards by the audio data items with their numbers in ascending order and upwards by those with their numbers in descending order starting from the highest number. If it is desired to select a data item not currently displayed, the desired data item can be brought into the optical disc-dedicated display area 51 for display by operating the scroll buttons 62 with the operation unit 17, remote controller 5 or input unit 4. With the data item on display, the corresponding field in the selection status display area 53 may be set either for the selected or the unselected state.

The selection status display area 53 shows whether each audio data item is currently selected. The selection status settings in the fields of the area 53 may be changed each by operation of the operation unit 17, remote controller 5 or input unit 4. Illustratively, when a given data item is selected, a status circle in the corresponding field of the display area 53 is rendered filled; when the data item is unselected, the corresponding circle is rendered blank.

The hard disc-dedicated display area 52 includes a music title display area 59 and a size display area 60. The music title display area 59 indicates the titles of the pieces of music stored on the HDD 6. The size display area 60 shows the data size of each audio data item being stored.

After obtaining the tables of recorded contents from the optical disc 13 and HDD 6, the information processing apparatus 1 displays the acquired tables (of recorded audio data) in the display areas 51 and 52 on the monitor 3. This allows the user visually to ascertain the audio data stored on the optical disc 13 and HDD 6.

In step S4, in response to the user's operation, the information processing apparatus 1 selects audio data items to be copied to the HDD 6 from among the audio data held on the optical disc 13. Specifically, the user clicks on the selection status setting (i.e., circle) in each field of the selection status display area 53 using a mouse or the like. The clicks, when detected, cause the information processing apparatus 1 to select either the selected state (indicated by a filled circle) or the unselected state (denoted by a blank circle) for each audio data item on display.

In step S5, the user suitably operates the operation unit 17, remote controller 5 or input unit 4 causing the information processing apparatus 1 to start copying under control of the CPU 23. The apparatus 1 reads the selected audio data items (their status circles shown filled) in the numbered sequence of the sequence display area 54 and copies the selected items consecutively to the HDD 6. As an alternative, the copying sequence may be changed as desired by the user.

A typical menu display screen 50 in effect while copying is in progress is described below by referring to FIG. 5. The first indicator area 58 showing progress status of all data being copied gradually changes in color from the leftmost position towards the rightmost position (in step S6 of FIG. 3). The first indicator area 58 also displays the title of the currently copied piece of music, a total data size of the audio data that have been copied so far, and the ongoing copying speed.

The information processing apparatus 1 displays the currently copied audio data item always in the middle of the optical disc-dedicated display area 51 so that the user can immediately recognize which data item is being copied. In the example of FIG. 5, the data item numbered "2" is currently copied and its title thus appears in the middle of the display area 51.

The information processing apparatus 1 turns the currently copied audio data item, i.e., the centrally positioned audio data item, into a block 64 that functions as a second indicator area 61 indicating progress status of the data item being copied. In the example of FIG. 5, the audio data item numbered "1" in the sequence display area 54 has already been copied, as indicated by the second indicator area 61 of that data item having completely changed its color. The audio data item numbered "2" in the sequence display area 54 is now being copied, with its color changed halfway reflecting progress status of the copying. Each copied audio data item (numbered "1" in the case of FIG. 5) is shifted in display from the optical disc-dedicated display area 51 to the hard disc-dedicated display area 52, so that the user can visually confirm that the copying of the audio data in question is indeed complete.

When the copying of all selected data is finished, the information processing apparatus 1 reaches step S7 (FIG. 3). In step S7, the apparatus 1 illustratively causes the monitor 3 to display a screen notifying the user of the completion of the copying.

As explained in the above examples, the user can visually verify both overall progress status and progress status of individual audio data items. Specifically, the user can see at a glance how far the copying of the desired audio data has progressed, which audio data item is being copied, and what is the amount of the audio data yet to be copied. If the personal computer happens to be disabled during copying, the user is able to know up to which data item the copying has been completed.

In the example above, the audio data stored on the optical disc 13 have been shown copied to the HDD 6. However, this is not limitative of the invention. Alternatively, the inventive apparatus allows data to be copied in diverse manners:
1. from the disc cartridge 11 to the HDD 6;
2. from the IC card 12 to the HDD 6;
3. from the HDD 6 to the disc cartridge 11;
4. from the HDD 6 to the IC card 12;
5. from the HDD 6 to the optical disc 13;
6. from the disc cartridge 11 to the IC card 12;
7. from the disc cartridge 11 to the optical disc 13;
8. from the IC card 12 to the disc cartridge 11;
9. from the IC card 12 to the optical disc 13; and
10. from an EMD (electronic music distribution) service to the HDD 6, disc cartridge 11, IC card 12, or optical disc 13.

The information processing apparatus 1 may illustratively copy audio data from the IC card 12 to the HDD 6 as mentioned above. In such a case, if any one of the audio data items on menu display is highlighted and switched from the selected state to the unselected state by the user, then the apparatus 1 also sets all remaining audio data items for the unselected state; if any one audio data item is switched from the unselected state to the selected state, then the apparatus 1 sets the remaining audio data items for the selected state as well. This feature is intend to simplify the user's data selecting chores by reducing the number of selecting operations that need to be performed by the user.

The feature above is described below in more detail by referring to FIG. 6. The information processing apparatus 1 is assumed to incorporate in the memory 24 a selection status holding part 71 that retains status settings in the selection status display area 53, i.e., the setting reflecting whether each of the audio data held by the IC card 12 in the IC card drive 8 is selected for copying to the HDD 6. In response to the user's selection status change input from the operation unit 17, remote controller 5 or input unit 4, the CPU 23 changes the selection status of the highlighted audio data item in the selection status holding part 71. When the user inputs a selected position change from the operation unit 17, remote controller 5 or input unit 4, the CPU 23 changes accordingly the selected audio data item position in the selection status holding part 71.

Described below with reference to FIG. 7A is a typical menu display screen 72 showing the audio data held in the IC card 12 when the data are to be copied to the HDD 6. The screen 72 is made up of four major areas: a selection status display area 73 showing the selected or unselected state of each audio data item which is held in the IC card 12 and which may or may not be copied; a music title display area 74 indicating the titles of the pieces of music constituted by the audio data held in the IC card 12; an artist name display area 75 listing the names of the artists associated with the audio data; and a playing time display area 76 showing the reproduction times of the audio data items being stored. The menu display screen 72 also includes: a designation button 77 used to designate the data item to be copied selectively; an all-designation button 78 used to specify whether or not to select all data to be copied; a copy start button 79 for starting the copying; and scroll buttons 80 for scrolling the menu display. Thus structured, the menu display screen 72 initially displays the centrally located data item (with a music title of "AAAAA" in the example of FIG. 7A) as a block 81 made different in color from the other data items in order to draw the user's attention. The block with its color thus changed means it is currently highlighted.

When a given data item is thus highlighted in the menu, the corresponding setting in the selection status display area 73 is either selected or unselected by clicking on the designation button 77 and all-designation button 78 with the operation unit 17, remote controller 5 or input unit 4. Clicking on the designation button 77 sets the currently highlighted data item either for the selected state (i.e., status circle shown filled) or for the unselected state (status circle shown blank). Clicking on the all-designation button 78 not only sets the currently highlighted data item for the selected or unselected state but also sets all remaining data items for the same state.

As shown in FIG. 7A and FIG. 8, if the data items on display are scrolled by operation of the scroll buttons 80, the centrally located data item in the menu is always shown highlighted. If any block 81 other than that of the centrally displayed item is highlighted specifically by the user manipulating the operation unit 17, remote controller 5 or input unit 4, then the particularly highlighted data item is positioned in the middle of the menu. In the example of FIG. 8, the data item with a music title of "DDDDD" is brought to the center of the menu either by operating the scroll buttons 80 or by highlighting specifically the data item with the title "DDDDD."

The data item or items to be copied are selected illustratively as described below with reference to FIG. 9. When the user first operates the operation unit 17, remote controller 5 or input unit 4 suitably, the information processing apparatus 1 loads into the memory 24 an application program for copying audio data from the IC card 12 in the IC card drive 8 to the HDD 6 under control of the CPU 23. In step S11 of FIG. 9, the CPU 23 performs a search through the audio data held in the IC card 12, and the GMCH 25 under control of the CPU 23 causes the result of the search to appear as a menu display screen 72 (shown in FIG. 7A) on the monitor 3. At this point, the GMCH 25 turns the centrally displayed data item block 81 (with the music title of "AAAAA") into a color different from that of the other data blocks, highlighting the block 81. The selection status holding part 71 in the memory 24 initially retains the status settings of the data items in the selection status display area 73. Illustratively, the holding part 71 retains as initial settings all data items being selected in the selection status display area 73. Obviously, the initial settings may alternatively be constituted by all data items being unselected. As another alternative of the initial settings to be retained, only the centrally displayed data item may be unselected and the remaining items all selected; as a further alternative, only the centrally displayed data item may be selected and the remaining items all unselected.

Figure 9:
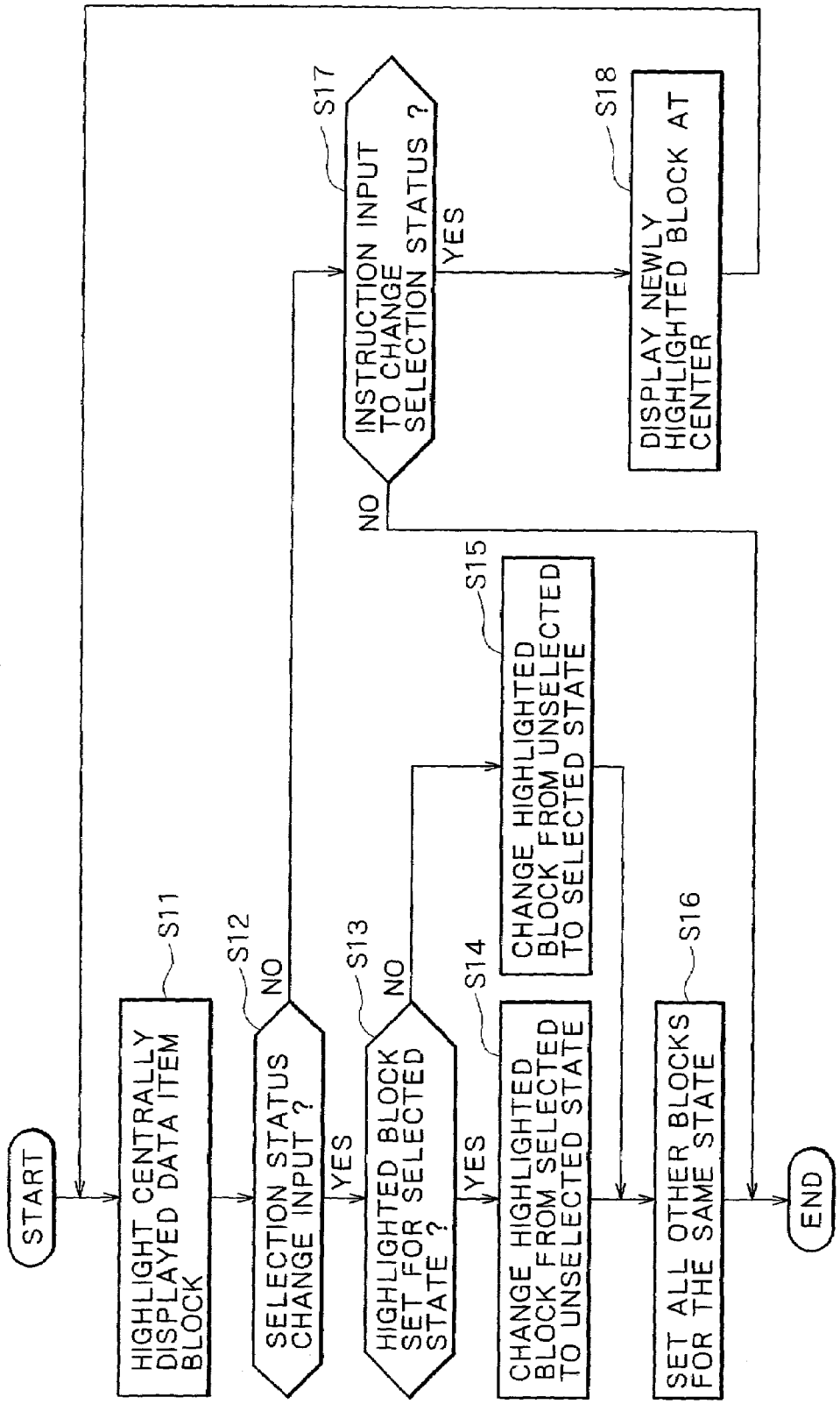
FIG. 9 is a flowchart of steps in which the data to be copied are selected.

In step S12 of FIG. 9, the CPU 23 judges whether any change is made in the content of the selection status display area 73 to the centrally displayed, currently highlighted data item (with the music title of "AAAAA" in FIG. 7A) from the operation unit 17, remote controller 5, or input unit 4. In other words, a check is made to see whether the all-designation button 78 is clicked. If such change is judged entered, step S13 is reached; if no such change is judged effected, step S17 is reached.

In step S13, the CPU 23 references the selection status holding part 71 to see whether the block 81 of the centrally displayed, currently highlighted data item is set for the selected state. If the block 81 is found set for the selected state, step S14 is reached; otherwise step S15 is reached.

In step S14, the CPU 23 judges that the block 81 of the centrally displayed, currently highlighted data item is in the selected state. Because the change in selection status was entered earlier, the CPU 23 proceeds accordingly to replace the selected state with the unselected state.

In step S15, the CPU 23 judges that the block 81 of the centrally displayed, currently highlighted data item is in the unselected state. In response to the change in selection status made earlier, the CPU 23 proceeds in this case to replace the unselected state with the selected state.

In step S16, the CPU 23 alters the status indications of the remaining data item blocks in the selection status display area 73 in accordance with the previously made change in the block 81 of the centrally displayed, currently highlighted data item. That is, if the block 81 of the centrally displayed, currently highlighted data item is changed from the unselected state to the selected state, then the CPU 23 sets the blocks of all remaining data items for the selected state (thus all status circles are shown filled) as depicted in FIG. 7B; if the block 81 of the centrally displayed, currently highlighted data item is changed from the selected state to the unselected state, then the CPU 23 sets the blocks of all remaining data items for the unselected state (all status circles shown blank) as indicated in FIG. 7C.

If no change was made in step S12 earlier, then the CPU 23 goes to step S17. In step S17, the CPU 23 checks to see whether any instruction is input from the operation unit 17, remote controller 5 or input unit 4 prompting a change in selection status to any data item block other than the block 81 of the centrally located data item. In other words, a check is made to see if the scroll buttons 80 are clicked or if any data item other than the centrally located data item is highlighted. If such an instruction is found entered, step S118 is reached; otherwise the processing is brought to an end.

In step S18, the CPU 23 alters the content of the selection status display area 73 in such a manner that the newly highlighted data item is positioned in the middle. That is, if the scroll buttons 80 are clicked, the block 81 of the centrally displayed data item is always shown highlighted. If any data item block other than the centrally located data item is highlighted, the newly picked data block is centrally displayed and shown highlighted.

As described, if most of the data items held in the IC card 12 need to be copied, then the user may highlight the block 81 of the selection status display area 73 in the unselected state (with status circle shown blank) and click on the all-designation button 78 to set all data items for the selected state (with status circles now shown filled). Then the user may highlight unnecessary data item blocks and click on the designation button 77 to set each unnecessary data item for the unselected state (with status circle shown blank). If only a few of the data items retained in the IC card 12 need to be copied, then the user may highlight the block 81 of the selection status display area 73 in the selected state (with status circle shown filled) and click on the all-designation button 78 to set all data items for the unselected state (with status circles shown blank). Then the user may highlight the desired data item blocks and click on the designation button 77 to set each necessary data item for the selected state (with status circle shown filled). Thereafter the user may click on the copy start button 79 to copy the required data from the IC card 12 to the HDD 6. In this manner, the number of operations to be performed by the user upon copying is made substantially smaller than if desired data items need to be individually selected for copying. This feature contributes to simplifying the user's data selecting chores preparatory to copying. Because the information processing apparatus 1 always displays the data item currently highlighted by the user in the middle of the menu, a high degree of visibility is ensured and thereby the ease of operation is enhanced.

Even if not all data items are displayed on the monitor 3, the steps described above allow the user easily to change currently invisible data items from the selected state to the unselected state or vice versa. With no need for the user to scroll the screen all the time, the operability of the apparatus is further improved.

In the example above, the audio data stored in the IC card 12 have been shown copied to the HDD 6. However, this is not limitative of the invention. Alternatively, the inventive apparatus allows data to be copied in the following cases as well:

1. from the optical disc 13 to the HDD 6;
2. from the disc cartridge 11 to the HDD 6;
3. from the HDD 6 to the disc cartridge 11;
4. from the HDD 6 to the IC card 12;
5. from the HDD 6 to the optical disc 13;
6. from the disc cartridge 11 to the IC card 12;
7. from the disc cartridge 11 to the optical disc 13;
8. from the IC card 12 to the disc cartridge 11;
9. from the IC card 12 to the optical disc 13; and
10. from an EMD service to the HDD 6, disc cartridge 11, IC card 12, or optical disc 13.

As described, the HDD 6 of the information processing apparatus 1 can accommodate data from diverse storage media: from the optical disc 13, from the IC card 12, or from any EMD service offering its data for download. The HDD 6 may be constituted illustratively by a mass-storage hard disc with a storage capacity of 40 gigabytes or thereabout, so that it can store audio data of up to 5,000 titles.

When audio data are copied from the disc cartridge 11, IC card 12 or optical disc 13 to the HDD 6, each audio data item saved onto the HDD 6 is associated with the name of the album that contains the data item in question, the title of the piece of music represented by the data item, the name of the artist involved with the audio data, and the date and time of data recording to the HDD 6, as shown in FIG. 10. The album names, music titles, artist names, and the dates and times of recording serve each as a keyword for a subsequent search through the audio data thus stored on the HDD 6.

Figure 11:
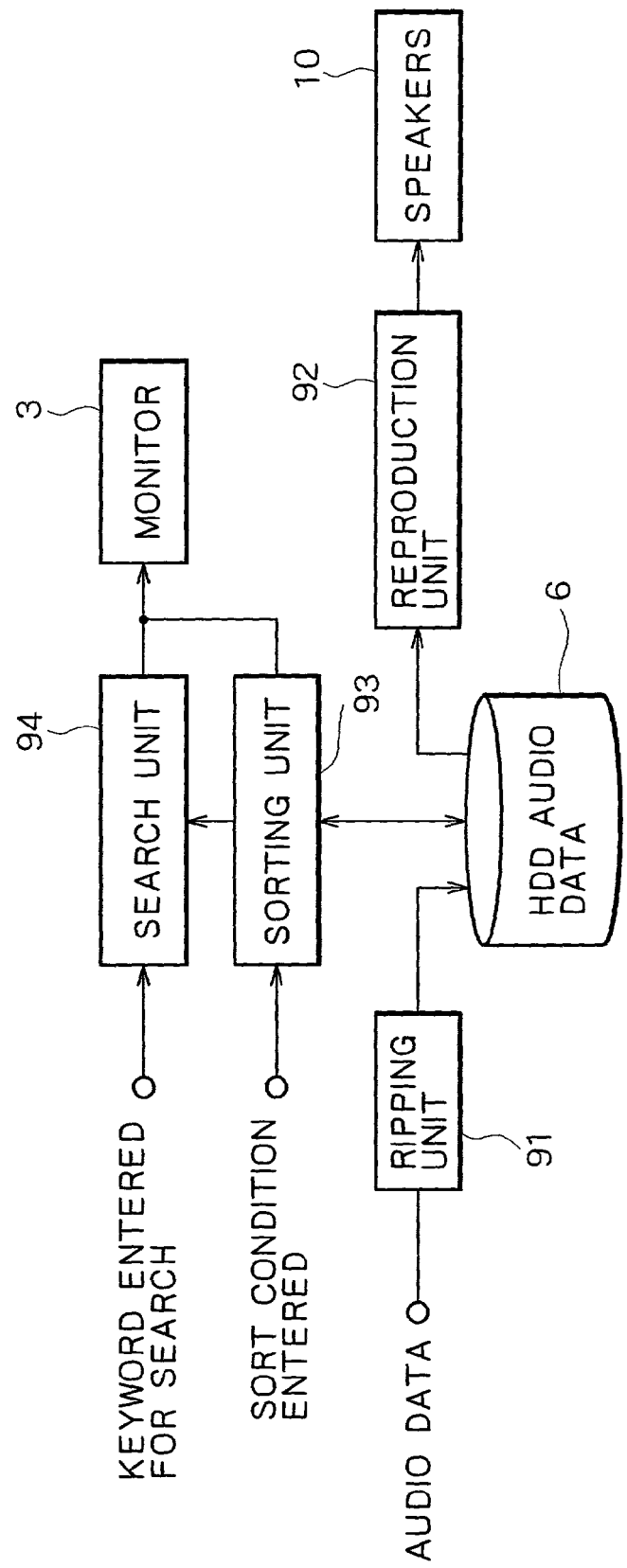
FIG. 11 is a block diagram of an information processing apparatus function for effecting searches through data recorded on the hard disc.

How audio data are saved onto the HDD 6 is described below by referring to FIG. 11. Audio data are first input from the video/audio input unit 42, disc cartridge drive 7, IC card drive 8, or optical disc drive 13. The input audio data are forwarded through the sound interface 34 and recorded to the HDD 6. In that case, a ripping unit 91 either included in the sound interface 34 or constituted by software converts the audio data to a format suitable for storage onto the HDD 6. Before being written to the HDD 6, all audio data items are associated with relevant album names, music titles, artist names, and dates and times of recording. The audio data are compressed illustratively by a method known as ATRAC3 (Adaptive Transform Acoustic Coding 3; trademark) before being copied to the HDD 6.

Alternatively, the audio data may be compressed by such methods as MPEG-2AAC (Moving Picture Experts Group 2 Advanced Audio Coding; trademark), MP3 (MPEG-1 Audio Layer 3; trademark), TwinVQ (Transform-Domain Weighted Interleave Vector Quantization; trademark), MS Audio (WMA: Windows Media Audio; trademark), or Ogg Vorbis (trademark).

The album names, music titles and artist names to be associated with the compressed audio data in storage are entered through the operation unit 17, remote controller 5 or input unit 4. Instead of manipulating the operation unit 17, remote controller 5 or input unit 4 in entering the album names, music titles and artist names, the user may gain access either to an external database through the network 15 or to an internal database built on the HDD 6 in order to acquire the necessary data entries. The dates and times of audio data recording are established by referring to a built-in clock of the apparatus body 2.

When reproducing audio data from the HDD 6, the user selects the desired audio data item. The CPU 23 retrieves the selected audio data item from the HDD 6 and subjects the retrieved data item to a reproduction process. The process is carried out by a reproduction unit 92 made up of the sound interface 34, audio DSP 39, and digital amplifier 40. After decompressing the audio data item from its compressed state, the reproduction unit 92 subjects the data to suitable signal processes such as equalizing and outputs the data thus processed through the speakers 10.

The information processing apparatus 1 retains on its HDD 6 search software that allows the user to search for and retrieve desired audio data items from among the numerous audio data items stored on the HDD 6. For data search purposes, the information processing apparatus 1 has two functionally distinct units: a sorting unit 93 and a search unit 94, both constituted by software.

A sort condition is input to the sorting unit 93 from the operation unit 17, remote controller 5 or input unit 4. Specifically, the sorting unit 93 first admits the sort condition in terms of an album name, a music title or an artist name. Given the condition, the sorting unit 93 sorts the data held on the HDD 6 alphabetically, in the order of the Japanese syllabary, or in any other suitable order by referring to the album names, music titles or artist names associated with the stored data. If the user enters a date and a time of recording as the sort condition, the sorting unit 93 sorts the audio data held on the HDD 6 chronologically or in reverse chronological order with reference to their dates and times of recording. The sorting unit 93 then causes the monitor 3 to display the data thus sorted as shown in FIG. 13B. The sorted data are arranged into a loop-like data sequence with the first data item positioned adjacent to the last data item.

The search unit 94 receives a keyword for search in terms of character data from the operation unit 17, remote controller 5 or input unit 4. The search unit 94 may also admit from the microphone 18 a keyword in the form of audio data having undergone a voice recognition process. A search for the data item identified by the keyword is effected by the search unit 94 comparing the entered keyword with the album names, music titles or artist names of the audio data held on the HDD 6. The result of the search is displayed on the monitor 3. Specifically, if character data are entered as the keyword from the operation unit 17, remote controller 5 or input unit 4, the search unit 94 performs a matching process starting from the first character string of the album names, music titles or artist names for search purposes, and displays the result of the search on the monitor 3 as shown in FIG. 13C. If the keyword is input by voice from the microphone 18, the search unit 94 compares the recognized voice with the character strings of the album names, music titles or artist names for search purposes, and displays the result of the search on the monitor 3 likewise.

In the case above, the search unit 94 positions the audio data item that matches or is the closest to the keyword in the middle of the menu and highlights that item in a color different from that of the other audio data items on the monitor 3. The reason why the audio data item that matches or is the closest to the keyword is centrally displayed is that the position attracts the user's attention most effectively; the centrally located data item is highlighted because that item is most likely to be reproduced by the user's next operation. Furthermore, the search unit 94 shifts the loop-like data sequence sorted by the sorting unit 93, in such a manner that the audio data item that matches or is the closest to the keyword is always displayed in the middle of the menu, flanked by the closely related data items on the monitor 3. Under the centrally displayed data item come the ensuing data items sorted by the sorting unit 93 and arranged downwards in sequential order; above the centrally displayed data item are the preceding data sorted likewise but arranged upwards in the reverse order. It should be noted that the number of the data items shown included in the result of the search is not limited to what is shown in the figures.

Described below with reference to FIG. 12 is how a search is typically made through audio data. When the search program is started, the information processing apparatus 1 causes the monitor 3 to display a menu display screen 101 as shown in FIG. 13A. The menu display screen 101 shows a menu of audio data items that were read into the memory 24 before being stored on the HDD 6. Each audio data item is shown associated with the name of the album that contains the data item in question, the title of the piece of music represented by the data item, the name of the artist involved with the audio data, and the date and time of data recording to the HDD 6. These audio data items are indicated randomly on the menu display screen 101.

In step S21 of FIG. 12, the sorting unit 93 admits a sort condition from the operation unit 17, remote controller 5 or input unit 4. In step S22, the sorting unit 93 sorts the audio data in accordance with the input sort condition and displays the result of the sorting on the monitor 3. In the example of FIG. 13B, an artist name is entered as the sort condition. In response, the sorting unit 93 sorts the stored artist names illustratively in alphabetical order, and the sorted data are arranged into a loop-like data sequence with the first data item positioned adjacent to the last data item. That is, in the example of FIG. 13B, the music title "AAAAA" associated with the first artist name "Ann" is shown adjacent to the music title "YYYYY" linked to the last artist name "Tom."

In step S23, the search unit 94 admits character data as the keyword for search from the operation unit 17, remote controller 5 or input unit 4. Alternatively, the search unit 94 may admit from the microphone 18 the keyword in the form of audio data having undergone a voice recognition process. In step S24, the search unit 94 performs a search by comparing the input keyword with the album names, music titles or artist names of the audio data which were read into the memory 24 before being stored on the HDD 6. The result of the search is displayed on the monitor 3. For example, FIG. 13C shows a screen indicating the result of the search with a music title of "QQQQQ" used as the keyword. The music title "QQQQQ" that matched the keyword is highlighted and displayed in the middle of the display. Under the centrally displayed data item come the ensuing data items sorted by artist name and arranged downwards in sequential order ("John," "Tom," etc.); above the centrally displayed data item are the preceding data also sorted by artist name but arranged upwards in the reverse order ("John, "Bob," etc.).

In the example above, the audio data items are sorted by artist name before being subjected to the search based on the keyword of a music title. As a result, the screen of FIG. 13C allows the user not only to search for the desired audio data item but also to check the music title of the artist associated with the data item in question.

For search purposes, audio data items may be sorted and searched for through different fields as described above, and may also be sorted and searched for in the same field. For example, if the music titles are sorted alphabetically, in the order of the Japanese syllabary, or in any other suitable order before being subjected to the search with a desired music title used as the keyword, the audio data item that matches or is the closest to the keyword is displayed in the middle of the menu, flanked vertically by the closely related data items. Even if the centrally displayed data item is not identical to what is desired, the necessary data item can likely be found nearby. As opposed to the above example in which the audio data items are initially sorted followed by the search for the target data item, the desired data item may be first searched for by use of the keyword and the result of the search may then be sorted based on a certain sort condition. Although the data held by the HDD 6 alone were shown subject to the search in the example above, this is not limitative of the invention. Alternatively, the sorting of and the search for desired data may also be carried out on the disc cartridge 11, IC card 12, optical disc 13, or a server connected through the network.

The menu display screen 50, 71 or 101 discussed above is displayed in superposed fashion on a background image. When any audio data item retrieved by the above-described search is reproduced, the monitor 3 shows as a background image a spectrum display of the audio data being played. Illustratively, all audio data being reproduced and output through the sound interface 34 are subject to fast Fourier transformation or other suitable processes for frequency analysis by the interface 34. Spectrum data derived from the analysis under control of the sound interface 34 are turned into a matching background image that is displayed on the monitor 3.

The menu display screen 50, 71 or 101 superposed on the background image shows the blocks of data items in menu form with different transmission factors. This feature is designed to enhance the visibility of the data on display.

More specifically, as shown in FIG. 14, the information processing apparatus 1 comprises a first mixer 111 and a second mixer 112, both implemented illustratively by software. Take, as an example, the menu display screen 101 that displays the result of the search. The first mixer 111 admits background image transmission factor data about each data item block as well as background image data, the transmission factor data being retrieved from a transmission factor table held in suitable storing means such as the HDD 6. As shown in FIG. 15, the transmission factor of a block 102a containing the centrally displayed data item that matches or is the closest to the keyword is set for zero percent relative to a background image 110. The transmission factor for each of the neighboring blocks around the centrally located data item block 102a is made progressively higher relative to the background image 110 the farther the neighboring block away from the central location. The first mixer 111 outputs to the second mixer 112 the background image data based on the varying transmission factors.

The second mixer 112 admits the background image data based on the dissimilar transmission factors, as well as character data made up of the album names, music titles, artist names, and recording times to be displayed in the blocks 102. The second mixer 112 mixes the character data with the transmission factor-based background image data and outputs the result of the data mixture to the monitor 3 for display.

The screen displayed on the monitor 3 in the case above is described below in more detail by referring to FIG. 15. The centrally located block 102a containing the audio data item that matches or is the closest to the keyword is given the lowest transmission factor of zero percent. That is, the background image 110 is totally hidden by the block 102a so that the block 102a attracts the user's highest attention. The upper and lower blocks 102b adjacent to the block 102a are given a slightly higher transmission factor barely allowing the background image 110 to be seen through. This allows the character data in the two adjacent blocks 102b to appear clearly and thus attract the user's second-highest attention next to the central block 102a. The next upper and lower blocks 102c adjacent to the blocks 102b are given a bit higher transmission factor than the blocks 102b relative to the background image 110. That is, the blocks 102c have a lower brightness level than the blocks 102b and thus attract the user's third-highest attention next to the blocks 102b. The next upper and lower blocks 102d adjacent to the blocks 102c are given a still higher transmission factor than the blocks 102c relative to the background image 110. In this example, the blocks 102d have the highest transmission factor and appear the darkest relative to the background image 110, attracting the user's attention the least. In other words, the blocks flanking the centrally located block 102a are given progressively higher transmission factors relative to the background image 110 the farther the block away from the central location; the character data in each block appear increasingly unclear the closer the block to the upper or lower edge of the menu.

According to the displaying method described above, the centrally located block 102a is assigned the lowest transmission factor of zero percent relative to the background image 110. The neighboring blocks 102b through 102d are each given a progressively higher transmission factor the farther the block away from the central location. That means the display data appear increasingly darker the closer the block to the upper or lower edge of the menu against the background image 110. On that display screen, the user's attention is first drawn to the centrally located block 102a before being attracted to the neighboring blocks in reverse proportion to their transmission factors. This feature is intended to enhance the visibility of the data items being displayed.

The above manner of controlling the transmission factor relative to the background image 100 may also apply to the menu display screen 50, 71 or 101 described earlier. It will be appreciated that the transmission factor of the centrally displayed block 102a relative to the background image 110 is not limited to zero percent as long as the central block attracts the user's highest attention, as shown on the menu display screen 50, 71 or 101. As an alternative to the above setup in which the transmission factor is varied block by block, the factor may be raised in a gradual, stepless fashion vertically on both sides of the centrally located block 102a.

In the example above, the progressively raised transmission factors of the blocks 102b through 102d relative to the background image 110 as they approach the upper or lower edge of the menu are implemented by use of the transmission factor table established on the HDD 6. Alternatively, since the information processing apparatus 1 has substantially the same functions as those of personal computers, the apparatus 1 need not have recourse to the transmission factor table. Depending on its diverse kinds of software installed, the information processing apparatus 1 may provide various menu screen displays. When any one of such displays is effected, the apparatus 1 may compute the transmission factor in terms of distance away from the centrally located block and then provide a menu display screen on which the transmission factors of varying display locations are determined according to the result of the computation relative to the above-mentioned background image 110.

The functions and features of the information processing apparatus 1 described above may be implemented either by hardware or by software. For the software-based processing to take place, programs constituting the software may be installed onto the HDD 6 either from the disc cartridge 11, IC card 12 or optical disc 13 loaded in the disc cartridge drive 7, IC card drive 8 or optical disc drive 9; or from an external source following a download process over the network 15.

While a preferred embodiment of the present invention has been described using specific terms, such description is for illustrative purposes only, and it is to be understood that changes and variations may be made without departing from the spirit or scope of the following claims.

What is claimed is:

1. A searching apparatus for searching through a storage device which holds main data based on a search condition and for displaying data retrieved through the search, said searching apparatus comprising:
    management data inputting means for inputting management data for managing said main data held on said storage device;
    storing means for storing the input management data;
    sorting means for sorting, based on a sort condition, said management data stored by said storing means;
    searching means for searching through said management data stored by said storing means based on a search condition;
    condition inputting means for inputting said sort condition and said search condition;
    displaying means for displaying results of said search and said sort on a display device connected to said searching apparatus; and
    controlling means for controlling a display location of said management data on said display device in accordance with a degree of relation between said search condition and said management data retrieved through said search,
    wherein if, as a result of said sort performed by said sorting means, a head data item heading said management data and an end data item at an end of said management data are both displayed on said display device, then the head and end data items are displayed adjacent to one another.

2. A searching apparatus according to claim 1, wherein, if said degree of relation between the retrieved management data and said search condition is high, the applicable management data are centrally located among other data when displayed on said display device.

3. A searching apparatus according to claim 2, wherein said displaying means displays a background against which said management data is displayed, and wherein said background is given a lower transmission factor for the centrally displayed data than for the other data.

4. A searching apparatus according to claim 2, wherein said searching means performs said search after said sorting means has carried out said sort.

5. A searching method for searching through a storage device which holds main data based on a search condition and for displaying data retrieved through the search, said searching method comprising steps of:
    inputting management data for managing said main data held on said storage device;
    storing the input management data;
    inputting a sort condition by which to sort the stored management data;
    sorting said stored management data based on the input sort condition;
    inputting a search condition by which to search through said stored management data;
    searching through said stored management data based on the input search condition; and
    displaying said management data based on results of said search and said sort and in accordance with a degree of relation between said search condition and said management data retrieved through said search,
    wherein if, as a result of said sort, a head data item heading said management data and an end data item at the end of said management data are both displayed on said display device, then the head and end data items are displayed adjacent to one another.

6. A searching method according to claim 5, wherein, if said degree of relation between the retrieved management data and said search condition is high, then applicable management data are centrally located among other data when displayed on said display device.

7. A searching method according to claim 6, further comprising a step of displaying a background against which said management data is displayed, wherein said background is given a lower transmission factor for the centrally displayed data than for the other data.

8. A searching apparatus for searching through a storage device which holds main data based on a search condition and for displaying data retrieved through the search, said searching apparatus comprising:

management data inputting means for inputting management data for managing said main data held on said storage device;

storing means for storing the input management data;

sorting means for sorting, based on a sort condition, said management data stored by said storing means;

searching means for searching through said management data stored by said storing means based on a search condition, wherein said searching means performs said search after said sorting means has carried out said sort;

condition inputting means for inputting said sort condition and said search condition;

displaying means for displaying results of said search and said sort on a display device connected to said searching apparatus; and controlling means for controlling a display location of said management data on said display device in accordance with a degree of relation between said search condition and said management data retrieved through said search;

wherein if, as a result of said sort performed by said sorting means, a head data item heading said management data and an end data item at an end of said management data are both displayed on said display device, then the head and end data items are displayed adjacent to one another.

9. A searching apparatus according to claim 8, wherein, if said degree of relation between the retrieved management data and said search condition is high, the applicable management data are centrally located among other data when displayed on said display device.

10. A searching apparatus according to claim 9, wherein said displaying means displays a background against which said management data is displayed, and wherein said background is given a lower transmission factor for the centrally displayed data than for the other data.

11. A searching method for searching through a storage device which holds main data based on a search condition and for displaying data retrieved through the search, said searching method comprising steps of:

inputting management data for managing said main data held on said storage device;

storing the input management data;

inputting a sort condition by which to sort the stored management data;

sorting said stored management data based on the input sort condition;

inputting a search condition by which to search through said stored management data;

searching, after said sorting, through said stored management data based on the input search condition; and displaying said management data based on results of said search and said sort and in accordance with a degree of relation between said search condition and said management data retrieved through said search;

wherein, if said degree of relation between the retrieved management data and said search condition is high, then applicable management data are centrally located among other data when displayed on said display device;

wherein if, as a result of said sort, a head data item heading said management data and an end data item at the end of said management data are both displayed on said display device, then the head and end data items are displayed adjacent to one another.

12. A searching method according to claim 11, further comprising a step of displaying a background against which said management data is displayed, wherein said background is given a lower transmission factor for the centrally displayed data than for the other data.

* * * * *